US012624717B2

(12) United States Patent
Dell et al.

(10) Patent No.: US 12,624,717 B2
(45) Date of Patent: May 12, 2026

(54) DEVICE FOR PROCESSING PHARMACEUTICAL CONTAINERS, AND SECURING DEVICE FOR SUCH A DEVICE

(71) Applicant: Bausch + Ströbel SE + Co. KG, Ilshofen (DE)

(72) Inventors: Edgar Dell, Ilshofen (DE); Benjamin Spang, Satteldorf (DE); Daniel Prozer, Groeningen (DE)

(73) Assignee: Bausch + Stroebel SE + Co. KG, Ilshofen (DE)

( * ) Notice: Subject to any disclaimer, the term of this patent is extended or adjusted under 35 U.S.C. 154(b) by 194 days.

(21) Appl. No.: 18/339,512

(22) Filed: Jun. 22, 2023

(65) Prior Publication Data

US 2023/0332634 A1 Oct. 19, 2023

Related U.S. Application Data

(63) Continuation of application No. PCT/EP2021/087278, filed on Dec. 22, 2021.

(30) Foreign Application Priority Data

Dec. 23, 2020 (DE) ..................... 10 2020 134 782.0

(51) Int. Cl.
*B65B 3/00* (2006.01)
*F16B 7/04* (2006.01)

(52) U.S. Cl.
CPC .............. *F16B 7/042* (2013.01); *B65B 3/003* (2013.01)

(58) Field of Classification Search
CPC .................................. F16B 7/042; B65B 3/003
See application file for complete search history.

(56) References Cited

U.S. PATENT DOCUMENTS 2,492,555 A * 12/1949 Cozzoli ................... B65B 3/003
74/568 R
2,523,560 A * 9/1950 Cozzoli ................... B65B 3/003
417/345
(Continued)

FOREIGN PATENT DOCUMENTS

DE          19938114 A1      2/2001
DE      102009025910 A1 *  12/2010   ............. B65G 47/90
(Continued)

OTHER PUBLICATIONS

Search Report received in International Application No. PCT/EP2021/087278 dated May 9, 2022, with translation, 6 pages.

*Primary Examiner* — Jason W San
(74) *Attorney, Agent, or Firm* — Christopher A. Rothe; CM Law

(57) ABSTRACT

An apparatus for processing pharmaceutical containers or components of pharmaceutical containers, and a securing device for detachably fastening a format part of an apparatus for processing pharmaceutical containers or components of pharmaceutical containers on a holding part of the apparatus. The format part has at least one container-specific, container-component-specific, or process-specific quality. The securing device includes a first securing element and a second securing element. The first securing element is arranged on or is part of the format part, and the second securing element is arranged on or is part of the holding part. The securing elements include magnetic elements that interact when the interconnected securing elements are in a securing position.

20 Claims, 7 Drawing Sheets

(56) References Cited

U.S. PATENT DOCUMENTS

| | | | | |
|---|---|---|---|---|
| 2,605,036 | A * | 7/1952 | Cozzoli | B65B 3/003 92/13 |
| 2,658,656 | A * | 11/1953 | Halahan | B65B 3/003 141/276 |
| 5,983,464 | A * | 11/1999 | Bauer | H01F 7/0263 24/303 |
| 6,210,033 | B1 * | 4/2001 | Karkos, Jr. | A47J 43/085 366/205 |
| 6,895,642 | B2 * | 5/2005 | Huang | F16M 13/022 248/205.5 |
| 7,217,059 | B1 * | 5/2007 | Rudduck | F16B 5/0657 403/324 |
| 7,435,031 | B2 * | 10/2008 | Granata | F16B 5/0628 403/329 |
| 7,475,934 | B2 * | 1/2009 | Sato | F16B 17/006 296/146.7 |
| 9,522,756 | B1 | 12/2016 | Celli et al. | |
| 10,526,102 | B2 * | 1/2020 | Herzog | B65B 59/04 |
| 10,669,049 | B2 | 6/2020 | Eberhardt et al. | |
| 10,882,653 | B2 | 1/2021 | Schaub et al. | |
| 11,518,064 | B2 * | 12/2022 | Krentz | B28B 7/0097 |
| 2002/0197107 | A1 * | 12/2002 | Granata | F16B 5/0628 403/381 |
| 2006/0136095 | A1 * | 6/2006 | Rob | G07F 11/62 700/245 |
| 2006/0259195 | A1 * | 11/2006 | Eliuk | B01F 33/8442 700/245 |
| 2011/0140474 | A1 * | 6/2011 | Smith | B62D 27/06 296/35.1 |
| 2012/0037266 | A1 * | 2/2012 | Bochenko | B65B 3/003 604/404 |
| 2012/0074807 | A1 * | 3/2012 | Burton | H02K 1/2753 310/156.28 |
| 2013/0318920 | A1 | 12/2013 | Herzog | |

| | | | | |
|---|---|---|---|---|
| 2014/0096467 | A1 * | 4/2014 | Norton | E04F 13/0833 52/582.2 |
| 2014/0238532 | A1 * | 8/2014 | Fangrow | A61J 1/2048 141/2 |
| 2015/0283957 | A1 * | 10/2015 | Dickinson | B60R 13/0206 24/303 |
| 2016/0001003 | A1 * | 1/2016 | Perazzo | A61M 5/1782 53/493 |
| 2016/0032954 | A1 * | 2/2016 | Porter | F16B 12/12 24/303 |
| 2016/0040693 | A1 * | 2/2016 | Popovski | B60R 13/0212 24/303 |
| 2016/0068117 | A1 * | 3/2016 | Huelke | F16B 1/00 24/303 |
| 2016/0340066 | A1 * | 11/2016 | Perazzo | B65B 3/003 |
| 2017/0015005 | A1 * | 1/2017 | Joplin | B65B 9/045 |
| 2017/0050753 | A1 * | 2/2017 | Glock | A61J 1/201 |
| 2018/0208377 | A1 * | 7/2018 | Kloke | B65B 3/003 |
| 2019/0174894 | A1 * | 6/2019 | Grunberger | A45C 13/1069 |
| 2023/0285242 | A1 * | 9/2023 | Shem-Tov | A61J 1/2089 |
| 2023/0332634 | A1 * | 10/2023 | Dell | B65B 7/2835 |
| 2023/0373671 | A1 * | 11/2023 | Boerret | B65B 7/2807 |
| 2023/0373734 | A1 * | 11/2023 | Waizenhoefer | B65B 3/003 |
| 2023/0406553 | A1 * | 12/2023 | Boerret | B65G 54/02 |
| 2024/0034493 | A1 * | 2/2024 | Prozer | B65B 3/006 |
| 2024/0375809 | A1 * | 11/2024 | Boehmike | B65B 43/54 |
| 2024/0383629 | A1 * | 11/2024 | Rothbauer | B65B 57/08 |

FOREIGN PATENT DOCUMENTS

| | | |
|---|---|---|
| DE | 102014214697 A1 | 1/2016 |
| DE | 202017106660 U1 | 11/2017 |
| DE | 102017213810 A1 | 2/2019 |
| DE | 102017126615 A1 | 5/2019 |
| JP | 2011133073 A | 7/2011 |
| WO | 2018020505 A1 | 2/2018 |

* cited by examiner

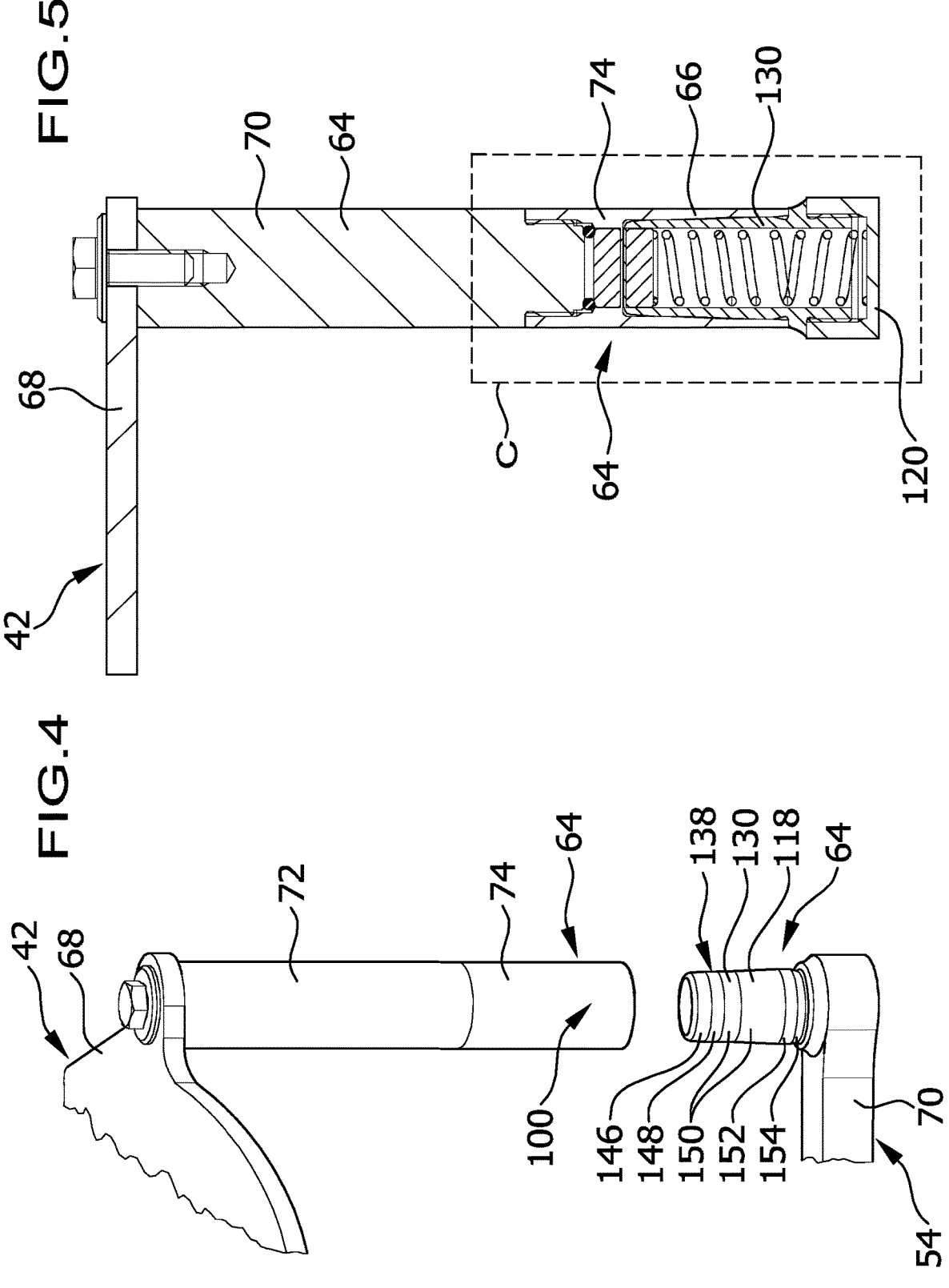

DEVICE FOR PROCESSING PHARMACEUTICAL CONTAINERS, AND SECURING DEVICE FOR SUCH A DEVICE

CROSS-REFERENCE TO RELATED APPLICATIONS

This application is a continuation application of international application number PCT/EP2021/087278, filed on Dec. 22, 2021, and claims the benefit of German application number 10 2020 134 782.0, filed on Dec. 23, 2020. The contents of international application number PCT/EP2021/087278 and German application number 10 2020 134 782.0 are incorporated herein by reference in their entireties and for all purposes.

FIELD

The present disclosure relates to a securing device for detachably fastening a format part of an apparatus for processing pharmaceutical containers or components of pharmaceutical containers on a holding part of the apparatus, wherein the format part has at least one container-specific, container-component-specific or process-specific quality.

In addition, the present disclosure relates to a device for processing pharmaceutical containers or components of pharmaceutical containers, comprising at least one format part and at least one holding part assigned thereto, wherein the at least one format part has at least one container-specific, container-component-specific or process-specific quality, and wherein the at least one format part can be detachably connected to the at least one holding part by means of a securing device.

BACKGROUND

The securing device of the aforementioned type is used in particular in an apparatus for processing pharmaceutical containers or components of pharmaceutical containers. Typically, the pharmaceutical containers, for example syringes, vials or carpules, are fed to the apparatus, filled with a liquid or solid pharmaceutical substance, subsequently closed, optionally marked, and fed or stored for further processing, for example, to/in a common carrier (nest). The pharmaceutical substance is in particular a medically active substance (agent). Vials may also be referred to as "bottles" or "phials."

In practice, so-called format parts are used in apparatuses for processing pharmaceutical containers or their components. The format parts can be detachably fixed to holding parts of the apparatus assigned to them. Holding parts are arranged, for example, on a frame, substructure or the like of the apparatus, or comprise the latter. The format parts are interchangeable parts that can be changed by a user depending on the task to be performed, adapted to the containers, their components and/or, for example, the filling process. Further process-specific properties of format parts are conceivable. For example, the format part used depends on a container type (such as syringes, vials or carpules), the dimension of a container (for example vials of different sizes) or the manner in which the container is to be closed. With respect to the latter point, format parts of the apparatus are to be mentioned, for example, which are used depending on the closing element used (for example mushroom plugs, plunger stoppers or crimp caps), in order to enable their processing. Also worth mentioning in this regard, as for example in the case of containers, is not only the type of closing element, but also, for example, its size. Other types of format parts can be process-specific, for example. For example, format parts are used depending on which substance is to be filled into the containers; differences can, for example, arise depending on whether the substance is liquid or powdery, on the viscosity a liquid substance possesses, and/or on the quantity of the substance with which the containers are to be filled.

An object underlying the present disclosure is to provide a securing device and an apparatus of the type mentioned at the outset which facilitate handling of the format parts.

SUMMARY

In a first aspect of the present disclosure, securing device for detachably fastening a format part of an apparatus for processing pharmaceutical containers or components of pharmaceutical containers on a holding part of the apparatus is provided. The format part has at least one container-specific, container-component-specific or process-specific quality. The securing device comprises a first securing element and a second securing element, wherein the first securing element is arranged on or comprised by the format part, and the second securing element is arranged on or comprised by the holding part. The securing elements comprise magnetic elements which interact when the interconnected securing elements are in a securing position.

In a second aspect of the present disclosure, an apparatus for processing pharmaceutical containers or components of pharmaceutical containers is provided. The apparatus comprises at least one format part and at least one holding part assigned thereto. The at least one format part has at least one container-specific, container-component-specific or process-specific quality. The at least one format part is detachably connectable to the at least one holding part by means of a securing device in accordance with the first aspect.

BRIEF DESCRIPTION OF THE DRAWINGS

The foregoing summary and the following description may be better understood in conjunction with the drawing figures, of which:

FIG. 4 is a view in accordance with detail B in FIG. 3 in a perspective exploded view;

FIG. 5 is a sectional view in accordance with detail B in FIG. 3;

DETAILED DESCRIPTION

Figure 1:
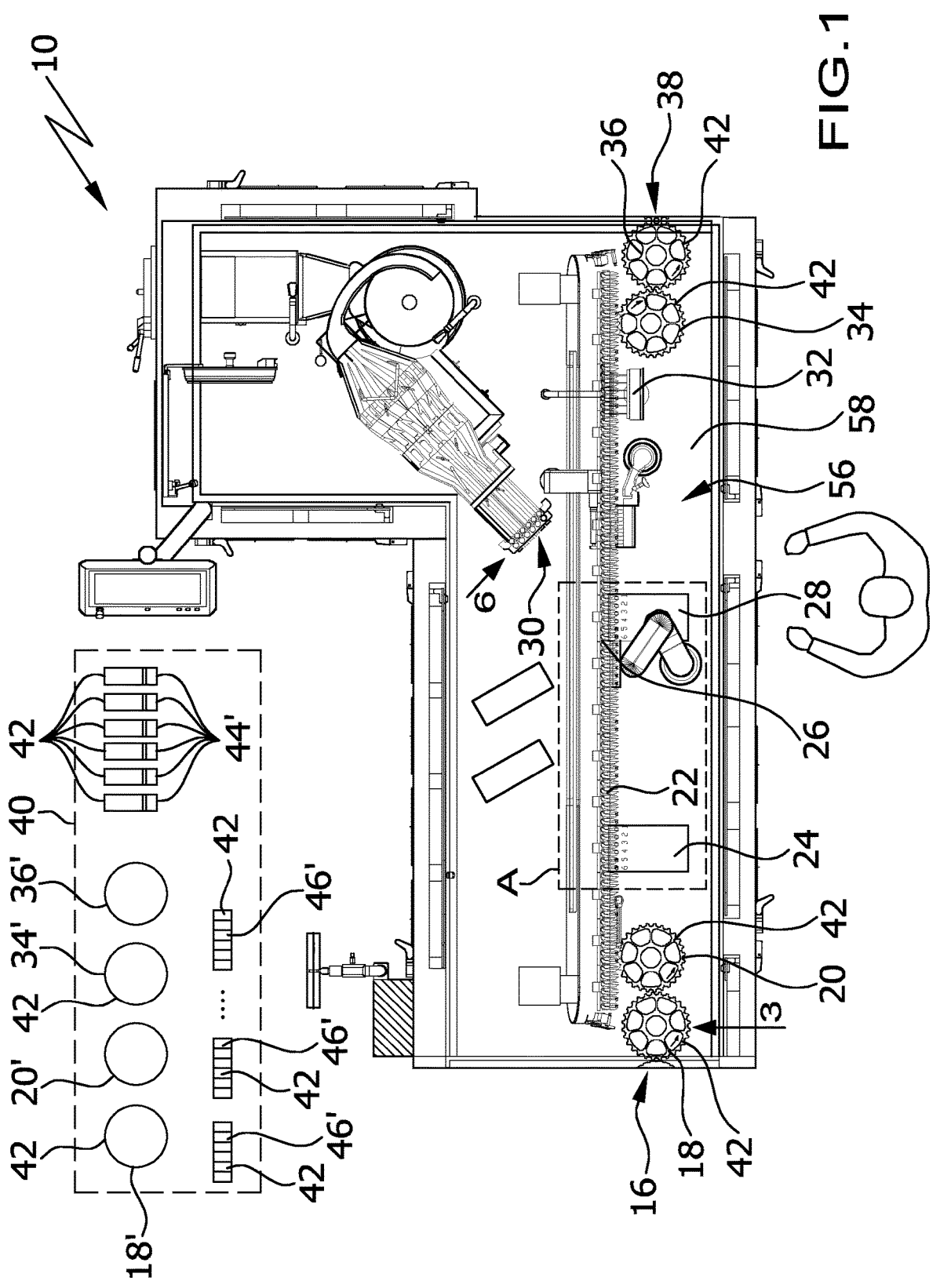
FIG. 1 is a plan view of an apparatus in accordance with the present disclosure for processing pharmaceutical containers and components thereof in a preferred embodiment in a schematic representation.

Although the present disclosure is illustrated and described herein with reference to specific embodiments, the present disclosure is not intended to be limited to the details shown. Rather, various modifications may be made in the details within the scope and range of equivalents and without departing from the present disclosure.

The present disclosure relates to a securing device for detachably fastening a format part of an apparatus for processing pharmaceutical containers or components of pharmaceutical containers on a holding part of the apparatus, wherein the format part has at least one container-specific, container-component-specific or process-specific quality, wherein the securing device comprises a first securing element and a second securing element, wherein the first securing element is arranged on or comprised by the format part, and the second securing element is arranged on or comprised by the holding part, and wherein the securing elements comprise magnetic elements which interact when the interconnected securing elements are in a securing position.

The securing device in accordance with the present disclosure makes it possible to fix the format part to the holding part assigned to it by means of a magnetic force. For this purpose, the respective securing elements comprise magnetic elements. If the securing elements for connecting the format part to the holding part are interconnected, the magnetic elements interact. In order to detach the format part from the holding part, it is, in particular, preferably only necessary to overcome the magnetic force between the magnetic elements and to remove the format part from the holding part. Both the attachment of the format part to the holding part and the detachment of the format part from the holding part, in particular a change of format, can therefore be performed in a user-friendly manner.

By using the magnetic elements, conventional securing elements for attaching format parts, for example screw connections or spring-loaded pressure elements, can in particular be omitted. This allows the apparatus to be given a simpler structural configuration using the securing device in accordance with the present disclosure.

The term "magnetic" is understood here to mean, for example, ferromagnetic or ferrimagnetic properties, not paramagnetic or diamagnetic properties.

At least one magnetic element can be a magnet. Preferably, both magnetic elements are magnets. Preferably, identical magnets are used which are arranged, for example, with opposite polarities to one another on the securing elements.

Alternatively, it can be provided that only one magnetic element is a magnet, and the other magnetic element is a magnetizable material.

The magnet is preferably a permanent magnet in order to simplify the structural configuration of the securing device. NdFeB magnets, for example, are used as the permanent magnets.

Preferably, apart from the magnetic elements, the securing elements are not magnetic or non-magnetizable.

The magnetic element can be fixed to the respective securing element in different ways. Provision can be made, for example, for fixing by a force-locking and/or positive connection and/or an integral bond.

A screw connection is conceivable, for example. In this case, for example, the magnetic element itself can be screwed to the securing element, or alternatively a separate screw element can be used.

Pressing and/or gluing the magnetic element to the securing element is conceivable, for example.

In a preferred embodiment of the present disclosure, the magnetic element can, for example, be injected, cast or rolled into the securing element.

Advantageously, the magnetic element is encapsulated in the securing element and free of contact with the atmosphere. In the present case, this can be understood to mean, for example, that the magnetic element is held in the securing element in such a way that there can be no or substantially no exchange of media between the magnetic element or a receiving space receiving it in the securing element and an atmosphere for the holding part or the format part. In this way, the magnetic element is protected from the atmosphere which may, for example, be a protective atmosphere and/or an atmosphere for decontamination purposes of a protective gas. $H_2O_2$, for example, is used as the protective gas.

In the securing position, the securing elements are in positive engagement with one another in a preferred embodiment of the present disclosure. In this way, a defined, reliable relative positioning of the securing elements and thus the format part on the holding part can be achieved.

It can be provided that the securing elements are interconnected with one another without gaps in the securing position.

It can be provided that when the securing elements are in the securing position, the magnetic elements are arranged at a distance from one another and free of contact with one another. In this way, the magnetic force can be adjusted appropriately in a structurally simple manner via an intermediate space between the magnetic elements such that, on the one hand, reliable fastening of the format part to the holding part and, on the other hand, easy detachment of the format part from the holding part can be achieved. The intermediate space can, for example, be an air gap. Alternatively, a wall of the first and/or of the second securing element can be arranged in the intermediate space.

In a structurally simple embodiment which has proven itself in practice, the securing elements comprise, for example, a receptacle and a projection which is arranged in the receptacle when the securing elements are in the securing position. In this way, a defined, reliable relative positioning of the securing elements can be achieved.

For example, the receptacle is arranged on the first securing element, and the projection is arranged on the second securing element.

Alternatively, the receptacle can be arranged on the second securing element, and the projection can be arranged on the first securing element.

In a structurally simple configuration of the securing device, the receptacle is, for example, a blind hole, and the projection is a pin which can be inserted into and removed from the blind hole.

It can be advantageous if the receptacle and the projection are each rotationally symmetrical or substantially rotationally symmetrical with respect to a common axis of the securing elements when they assume the securing position. This configuration preferably facilitates the interconnection of the securing elements. Furthermore, the projection and the receptacle preferably have better cleanability properties.

The projection is advantageously configured to taper in the insertion direction into the receptacle, and the receptacle is preferably configured to taper in the insertion direction starting from an insertion opening for the projection. This makes it easier to insert the projection into the receptacle.

When the securing elements assume the securing position, an edge of an insertion opening of the receptacle advantageously rests in a flange-like manner on a shoulder arranged on the projection.

It may be advantageous if an end face of the projection facing the base of the receptacle is planar. Alternatively or in addition, a base of the receptacle may be planar, for example.

The aforementioned taper of the projection and/or of the receptacle is advantageously conical at least in portions. It can prove advantageous, for example, if the projection and/or the receptacle in the insertion direction comprises portions with different conicity. This can be understood to mean, for example, that a degree of the conical taper is different in different portions of the projection and/or of the receptacle.

It can be advantageous if the projection and the receptacle comprise at least one corresponding fit interconnected in the securing position. In this way, a defined seat of the projection in the receptacle is made possible.

The at least one fit is, for example, a cylinder fit which is formed by respective lateral surfaces of the projection and of the receptacle.

It has proven advantageous in practice if, relative to the insertion direction, two fits are arranged at a distance from one another on the projection and on the receptacle. The projection and the receptacle comprise different diameters with respect to the aforementioned common axis in particular at the fits.

The projection and the receptacle preferably taper upstream in the insertion direction of the first fit. Between the fits, the projection and the receptacle preferably taper in the insertion direction.

In a preferred embodiment of the present disclosure, the magnetic element is arranged on the base of the receptacle, and/or the magnetic element is arranged on an end face of the projection.

In a preferred embodiment, it can be provided that at least one of the securing elements has or forms a receiving body with a receiving space, in which the magnetic element is arranged, on one side of a wall of the receiving space that faces away from the respectively other securing element. For example, at least one securing element comprises the wall that faces the other securing element, wherein the magnetic element is arranged on the wall on the side facing away from the other securing element. Relative to the other securing element, the magnetic element is arranged "behind" the wall so to speak. As a result, the magnetic element is, for example, gripped by the wall in the receiving body or encapsulated by the latter.

The magnetic element may, for example, be arranged on the base of the receptacle behind the wall (a base wall).

The magnetic element may, for example, be arranged on the end face of the projection behind the wall (an end wall).

A positive-locking arrangement of the magnetic element in the receiving space, in particular transverse to the aforementioned axis, has proven advantageous, for example.

It can be favorable if the magnetic element is acted upon by a pressing element with a force preferably in the direction of the additional securing element. The pressing element acts, for example, on the magnetic element such that the latter rests against the aforementioned wall.

Alternatively or in addition, provision can be made for a sealing element to be arranged on the magnetic element on the side facing away from the respectively other securing element. This is advantageous, for example, with the subsequently mentioned screw connection of the receiving member to the base member with regard to an encapsulation of the magnetic element in the securing element.

It can be provided, for example, that the securing element comprises a receiving member forming the receiving space and a base member connected to the receiving member preferably by a screw connection. For example, a respective securing element comprises a base member, wherein the receiving members are in engagement with one another in the securing position.

It may be advantageous if the securing device comprises a plurality of first securing elements and second securing elements. In this case, the first securing elements are advantageously configured identically, and the second securing elements are preferably configured identically.

As already mentioned, the present disclosure also relates to an apparatus for processing pharmaceutical containers or components of pharmaceutical containers.

The aforementioned object is achieved according to the present disclosure in a generic apparatus in that the at least one format part can be detachably connected to the at least one holding part by means of a securing device of the type described above.

The advantages which were already mentioned in connection with the explanation of the securing device in accordance with the present disclosure can likewise be achieved with the apparatus in accordance with the present disclosure. Advantageous embodiments of the apparatus result from advantageous embodiments of the securing device. In this regard, reference can be made to the above statements.

It can be provided, for example, that two or more format parts, which differ from one another with regard to their qualities, are assigned to a respective holding part, wherein the format parts can selectively be connected to the holding part. Depending on which format part is required for the task to be carried out, the format part can be attached to the holding part. An existing format part can be detached from the holding part beforehand. The format parts differ in particular in at least one of the container-specific, container-component-specific or process-specific qualities.

A format part can be assigned, for example, a plurality of holding parts and be connected to the holding parts via a respective securing device.

The format part can, for example, be a carrier part for the containers, in particular a transport wheel or a gripping element for the containers.

The format part can, for example, be a plunger for a closing element of the container.

However, the present disclosure is not limited to the last-mentioned examples of possible format parts. Reference is made in this regard to the above and following statements.

FIG. 1 shows a plan view of an advantageous embodiment of the apparatus in accordance with the present disclosure for processing pharmaceutical containers 12, which is designated as a whole by reference numeral 10. In the present exemplary embodiment, the pharmaceutical containers are vials 14 (FIG. 2) which are to be filled with a pharmaceutical substance.

The containers 12 are transferred to the apparatus 10 at a feed region 16. In this case, the containers 12 are transferred to a transport wheel 18 followed by an additional transport wheel 20. The transport wheel 20 transfers the containers 12 to a linear transport device 22.

By the transport device 22, the containers 12 are first transported to a weighing station 24, then to a filling station 26, to an additional weighing station 28, to a closing station 30 and finally to a monitoring station 32.

Following the monitoring station 32, the containers 12 are transferred via a transport wheel 34 to an additional transport wheel 36 followed by a delivery region 38.

It is understood that at the feed region 16, the apparatus 10 can, for example, comprise devices for feeding the containers 12 from a common carrier (nest) and/or as volume material (bulk). In a corresponding manner, the apparatus 10 can, in the delivery region 38, comprise devices for transferring the containers 12 into the common carrier (nest) and/or for storing the containers 12.

With the apparatus 10, containers 12 of different types and/or different dimensions can be processed. For example, in deviation from the vials 14 shown here, syringes and/or carpules can be processed by means of the apparatus 10. The containers 12, whether vials, syringes or carpules, can have different dimensions.

Depending on the containers 12 to be processed, the apparatus 10 can be adapted to the container-specific, container-component-specific (for example closing elements such as mushroom plugs, plunger stoppers or crimp caps) and/or to process-specific qualities of the containers 12. The process-specific quality relates, for example, to the configuration of the filling station 26 depending on which pharmaceutical is to be filled into the containers 12. For example, there can be differences with regard to the form of the pharmaceutical (liquid or powdery), the amount of substance to be added or the flow properties thereof, for example the viscosity.

In order to adapt the apparatus 10 to the task for processing the respective containers 12, the apparatus 10 preferably has a plurality of format sets 40. FIG. 1 schematically shows an unused format set 40. When the apparatus 10 is converted, the format set 40 can, for example, replace the format set inserted therein.

A respective format set 40 comprises at least one format part 42 and, in the present case, in particular a plurality of format parts 42. The format parts 42 have container-specific, container-component-specific or process-specific qualities. For example, format parts 42 of the same type, such as transport wheels, differ in that containers 12 of different types and/or of different sizes have to be processed.

Depending on the task, it may happen that not a complete format set 40 but only a portion of format parts 42 of the format set 40 have to be changed.

Figure 7:
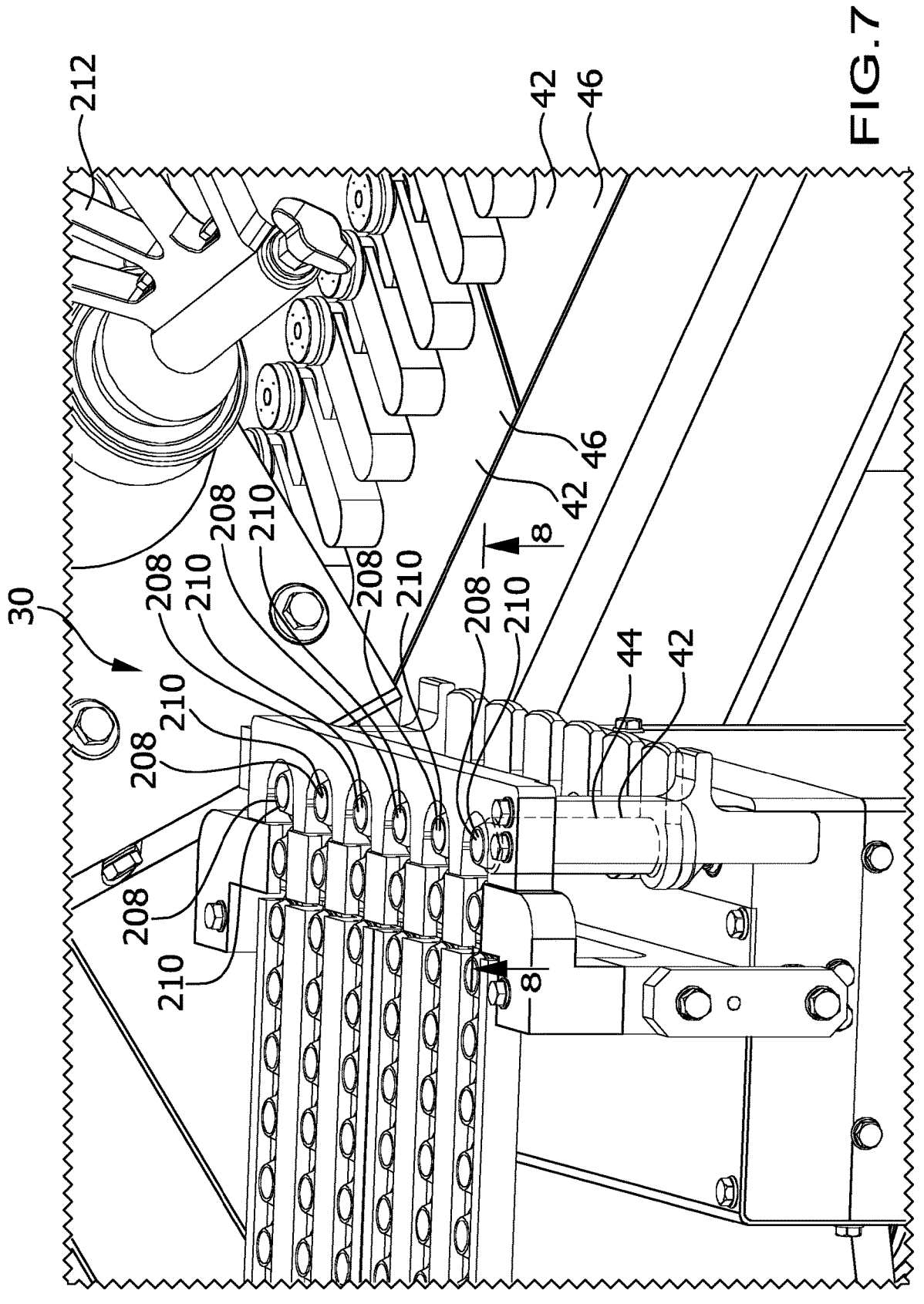
FIG. 7 is a perspective partial view of the apparatus from FIG. 1 as viewed along the arrow "6" in FIG. 1.
Figure 8:
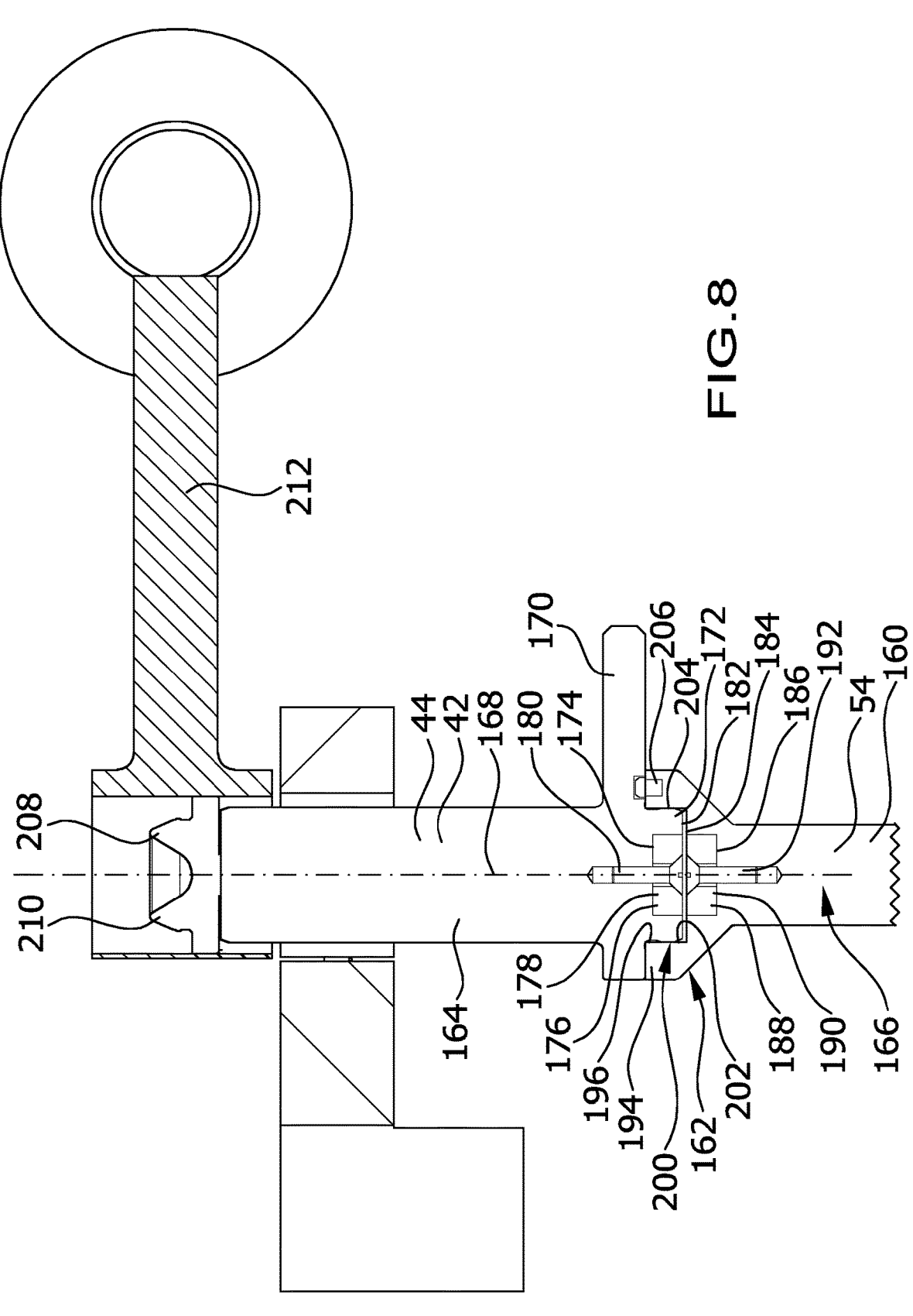
FIG. 8 is a schematic sectional view along line 8-8 in FIG. 7 in a different working position of the apparatus than in FIG. 7.

By way of example, the format set 40 shows transport wheels 18', 20', 34' and 36' as replacement parts for the transport wheels 18, 20, 34 or 36. Furthermore, the format set 40 shows, for example, plungers 44' as replacement parts for plungers 44 which are used in the closing station 30 (FIGS. 7 and 8).

Figure 2:
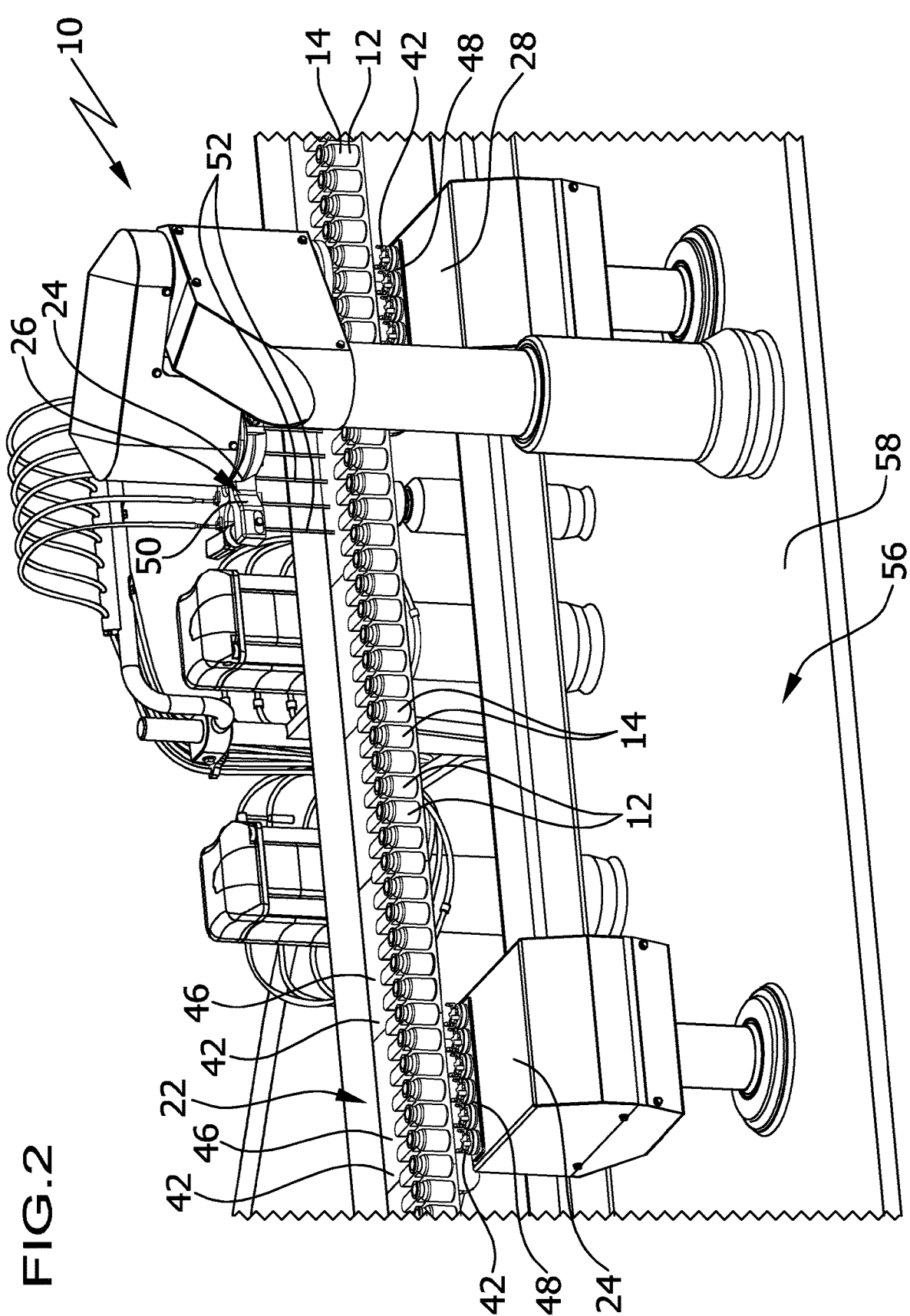
FIG. 2 is a perspective view of detail A in FIG. 1.

Moreover, the format set 40 shows, by way of example, gripping elements 46' which can be used as replacement parts for gripping elements 46. The gripping elements 46 are used in the transport device 22 in order to always hold a plurality of containers 12 (FIG. 2).

Further possible format parts are, for example, receiving elements 48 at the weighing stations 24, 28 and a holding element 50 for needles 52 at the filling station 26.

In the apparatus 10, the format parts 42 are detachably connected to holding parts 54 when they are used. By detaching the format part 42 from the holding part 54, a format change can in particular be performed in which the format part 42 is replaced by another format part 42. Accordingly, a plurality of format parts 42 can be assigned to a respective holding part 54.

This is first explained in the following using the example of the transport wheel 18 as a format part 42. During a format change, the transport wheel 18 can be replaced by the transport wheel 18', for example. The following statements with respect to the transport wheel 18 can apply in particular in an identical or similar way to the transport wheels 20, 34 and 36.

The holding parts 54 for the format parts 42 are fixed, for example, to a frame 56 or substructure of the apparatus 10. The frame 56 is set up, for example, on a floor of a laboratory or the like.

Figure 3:
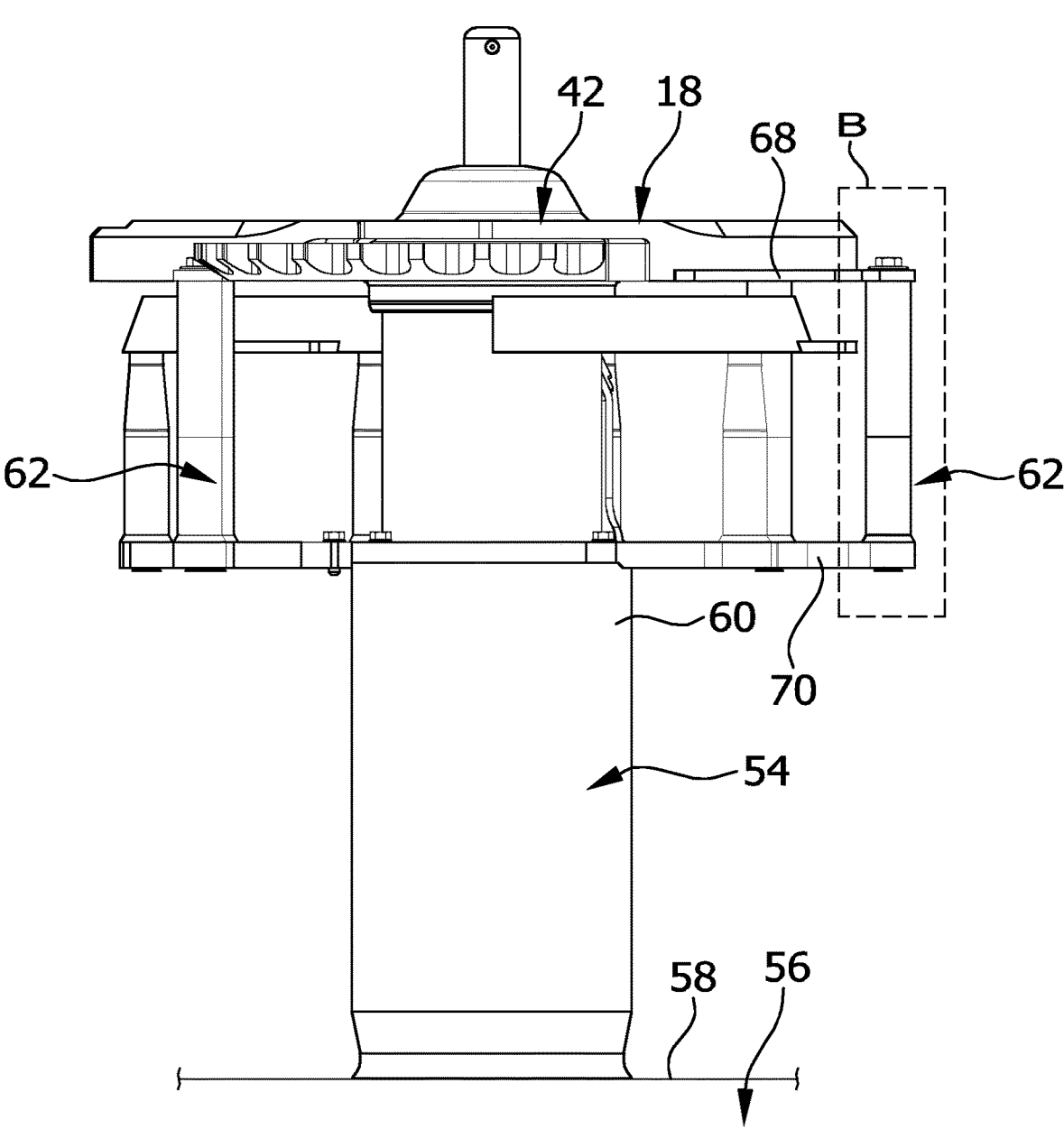
FIG. 3 is a view along the arrow "3" in FIG. 1, in which a holding part and a format part as well as securing devices in accordance with the present disclosure are shown in a preferred embodiment.
Figure 6:
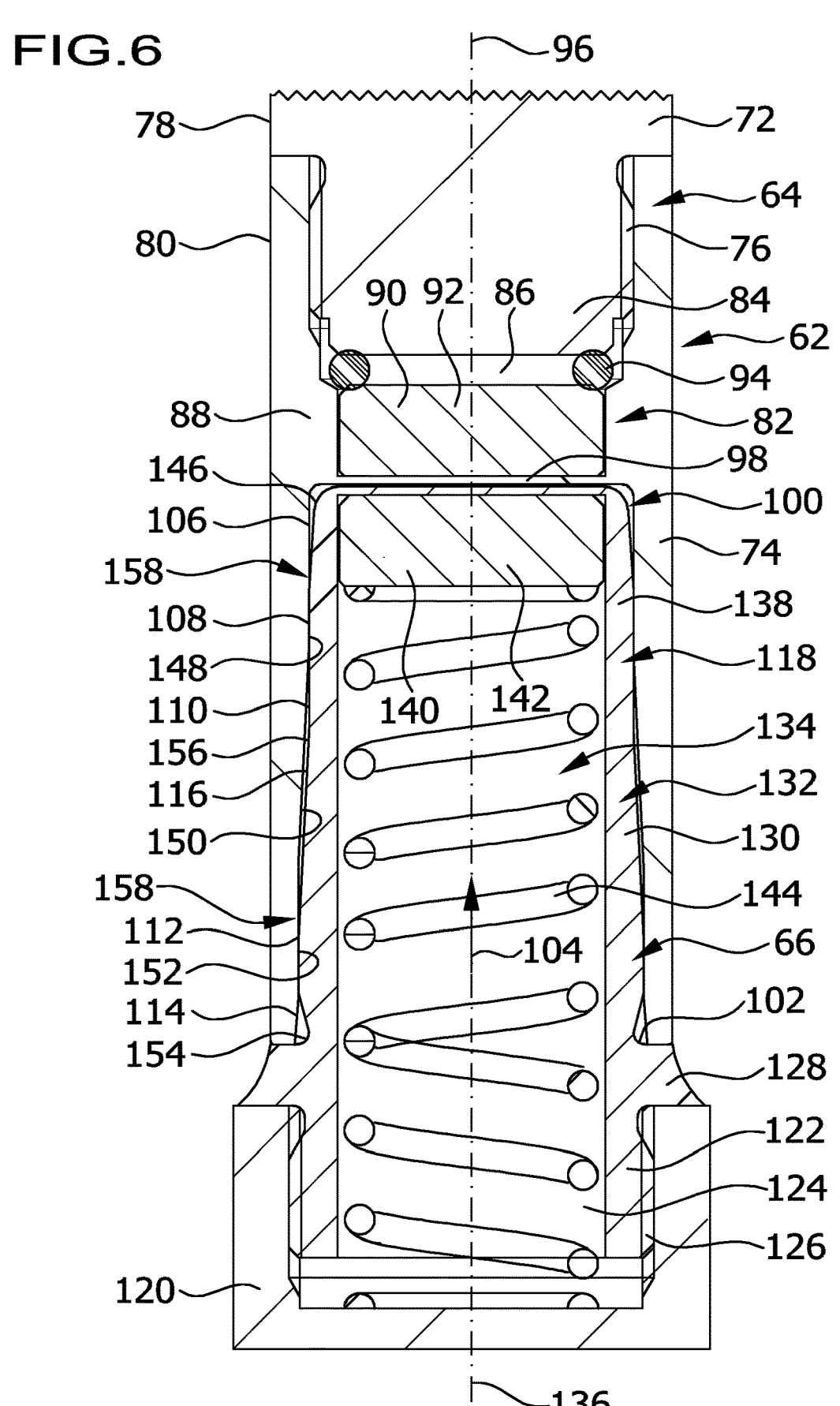
FIG. 6 is an enlarged view of detail C in FIG. 5.

A column element 60 arranged on a mounting element 58 of the frame 56 is used as the holding part 54 for the transport wheel 18 (FIG. 3).

In accordance with the present disclosure, the format part 42 designed as a transport wheel 18 can be detachably connected to the holding part 54 via at least one securing device 62. In the present case, a plurality of securing devices 62 is provided in order to fix the transport wheel 18 to the holding part 54. The configuration of the securing devices 62 is identical so that only one of the securing devices 62 is discussed below with reference to FIGS. 3 to 6.

The securing device 62 comprises a first securing element 64 comprised by the format part 42 and a second securing element 66 comprised by the holding part 54.

In the present example, the first securing element 64 is fixed to a holding member 68 of the transport wheel 18. The second securing element 66 is fixed to a holding member 70, wherein the holding member 70 is fixed to the column element 60.

The securing element 64 is pin-shaped and, in the present case, comprises a base member 72 which is fixed at one end to the holding member 68. The securing element 64 comprises a receiving member 74 at the end remote from the holding member 68. The receiving member 74 is connected to the base member 72, in the present case by a screw connection 76. In this case, the receiving member 74 has an internal thread which couples to an external thread of the base member 72. The base member 72 and the receiving member 74 are dimensioned such that their respective lateral surfaces 78, 80 are aligned with one another on the outer side.

The receiving member 74 forms a receiving body 82 which overlaps an end portion 84 of the base member 72. A receiving space 86 of the receiving member 74 is delimited in the circumferential direction and at the end face by a wall 88 of the receiving member 74 and the end face opposite the base member 72.

A magnetic element 90 is received with positive engagement in the receiving space 86. The magnetic element 90 is a magnet 92, in particular a permanent magnet, for example an NdFeB magnet. For example, the magnet 92 is disk-shaped. A sealing element 94 is arranged between the magnet 92 and the end portion 84 and seals the receiving space 86 with respect to the screw connection 76.

The securing element 66 defines an axis 96 and is rotationally symmetrical with respect thereto.

The magnetic element 90 is arranged in the receiving space 86 such that it rests against the end-face portion of the wall 88. The wall 88 forms a base 98 of a receptacle 100 for the second securing element 66. The magnet 92 is arranged on the base 98, with respect to the securing element 66 behind the wall 88.

The receptacle 100 extends in the axial direction and is delimited in the circumferential direction by the wall 88. At one end side, the receptacle 100 comprises an insertion opening 102. As explained below, the securing element 66 can be partially inserted in an insertion direction 104 into the receptacle 100.

Starting from the insertion opening 102, the receptacle 100 tapers in the insertion direction 104. Starting from the base 96, the receptacle 100 comprises a tapering portion 106, followed by a cylindrical portion 108, which in turn is followed by a tapering portion 110, followed by an additional cylindrical portion 112 and, in the region of the insertion opening 102, an additional tapering portion 114. The portions 106 to 114 belong to a radially inner lateral surface 116 of the wall 88 with respect to the axis 96.

The second securing element 66 comprises a pin-shaped projection 118. A bush-shaped base member 120 of the securing element 66, which is connected to the projection 118, is formed on the holding member 70. For this purpose, the projection 118 engages with a portion 122 of a recess 124 of the base member 120. The projection 118 is fixed to the base member 120 via a screw connection 126 with an internal thread of the base member 120 and an external thread of the portion 122. An annular shoulder 128 is arranged outside the recess 124 and rests in a flange-like manner against an edge of the opening of the recess 124.

The projection 118 is designed as a receiving member 130 which forms a receiving body 132 with a receiving space 134. Overall, the projection 118 is rotationally symmetrical with respect to an axis 136. When the securing elements 64, 66 are in a securing position, the axes 96, 136 are aligned with one another and form a common axis of both securing elements 64, 66.

The projection 118 comprises a wall 138 which delimits the receiving space 134. The wall 138 encloses the receiving space 134 in the circumferential direction of the axis 136 and on the end face. In the present case, the end-face portion of the wall 138 is planar, as is the base 98 which is formed by the end-face portion of the wall 88. When the securing elements 64, 66 are in the securing position, the end-face portion of the wall 138 can rest flat against the base 98.

A magnetic element 140 is arranged in the receiving space 134. The magnetic element 140 is a magnet 142, in particular a permanent magnet, for example an NdFeB magnet. For example, the magnet 142 is disk-shaped.

The magnet 142 is arranged to positively engage in the receiving space 134 and rests against the end-face portion of the wall 138. With respect to the securing element 64, the magnet is arranged on the end face behind the wall 138.

The magnets are at a distance from one another. Between the magnets 92, 142, there is an intermediate space in which the two end-face portions of the walls 88, 138 are arranged in the present case.

A pressing element 144, configured as a coil spring, is arranged in the receiving space 134 and acts on the magnet 142 with a force directed toward the securing element 64. The side of the pressing element 144 facing away from the magnet is supported on the base member 120.

The projection 118 tapers in the insertion direction 104. Starting from the end-face portion of the wall 138, the projection 118 comprises a tapering portion 146, followed by a cylindrical portion 148, followed by a tapering portion 150, followed by an additional cylindrical portion 152 which is followed by a portion 154 with an undercut. The portions 146 to 154 are formed by the outer lateral surface 156 of the projection 118.

As already mentioned, the securing elements 64, 66 can assume a securing position. For this purpose, the projection 118 can be inserted into the receptacle 100. This is facilitated for the user by the respective tapers. In so doing, the projection 118 is inserted until the wall 138 rests against the end face of the base 98. If this is the case, the wall 88 rests against the annular shoulder 128 by the edge of the insertion opening 102.

In the securing position, the securing elements 64, 66 positively engage with one another and are connected to one another without gaps. The following respective portions of the receptacle 100 and of the projection 118 are adjacent to one another: Portions 106 and 146, 108 and 148, 110 and 150, 112 and 152, and 114 and 154.

The portions 108 and 148 on the one hand and 112 and 152 on the other hand respectively form the fits 158. In the present case, the fits are cylinder fits.

It has proven advantageous in practice if the portions 106, 110, 114, 146 and 150 having a respective taper are conically tapered. In particular, it may be favorable that the conicity of the portions 110 and 152 is not constant in the axial direction, but that these portions have two regions of different inclination in the axial direction with respect to the axis 96, 136.

In the present case, the magnets 92, 142 are received in the receiving spaces 86 and 134 with a positive engagement as mentioned. In accordance with the present disclosure, the following type of fastening on the respective securing element 64, 66 can be provided: by force-locking and/or positive connection, by a screw connection, by pressing, by gluing, by injection or casting.

When the securing elements 64, 66 assume the securing position, the magnets 92, 142 interact via the magnetic force. For this purpose, the magnets 92, 142 in particular have opposite polarities to one another. The magnetic coupling makes it easy for the user to connect the format part 42 to the holding part 54. Any screw connections or pressure pieces, as used in conventional format parts and holding parts, can be omitted. In a corresponding manner, the format part 42 can be detached in a user-friendly manner by lifting the holding part 54 by overcoming the magnetic force.

In particular, the securing device 62 is pharmaceutically compliant. The receiving spaces 86 and 134 are closed by the respective screw connections 76, 126. The base members 72, 120 and the receiving members 74, 130 are in particular made of a pharmaceutically-compliant material, for example of stainless steel.

The qualities of the plungers 44 as format parts 42 are discussed below with reference to FIGS. 7 and 8. A support part 160 on which the plunger 44 is arranged is provided as the holding part 54.

By means of a securing device 162 with a first securing element 164 and a second securing element 166, the plunger 44 can be detachably connected to the support part 160.

The first securing element 164 is formed by the plunger 44 itself. The latter is piston-like and, on a side facing the support part 160, has a projection 170 extending radially with respect to an axis 168. A projection 172 is provided in the axial direction.

The axis 168 is a common axis of the securing elements 164, 166 when they assume the securing position.

A recess 174 is formed on the end face of the projection 172. A magnetic element 176 in the form of a magnet 178 and in particular permanent magnet is arranged in the recess 174. The magnet 178 is received in a positive engagement in the recess 174 and secured therein by means of a screw element 180, for example. The magnet 178 is annular in the present case.

The second securing element 166 is formed by the support part 160. The support part 160 comprises a receptacle 182 in the direction of the plunger 44. A recess 186 is formed in a base 184 of the receptacle 182.

A magnetic element 188, in particular configured as a magnet 190 and specifically a permanent magnet, is arranged in the recess 186. The magnet 190 is secured, for example, by means of a screw element 192 in the recess 186. The magnet 190 in the present case is annular.

In the securing position of the securing elements 164, 166, the projection 172 engages positively in the receptacle 182. An edge 194 of an insertion opening 196 of the receptacle 182 rests against the radial projection 170.

In the region of the base 184 of the receptacle 182, an intermediate space 198 is formed between the magnets 178 and 190 so that they are spaced apart from one another and do not rest against one another. In the present case, the intermediate space is an air gap.

A fit 200, in this case a cylindrical fit, is formed by respective portions 202 and 204 of the outer lateral surfaces of the projection 172 and of the inner lateral surface of the receptacle 182 and ensures that the format part 42 is reliably seated on the holding part 54. In addition, an anti-rotation element 206 is operative between the projection 172 and the edge 194.

When the securing elements 164, 166 assume the securing position, the magnets 178, 190 interact via the magnetic force. For this purpose, the magnets 178, 190 in particular have opposite polarities to one another. The magnetic coupling makes it easy for the user to connect the format part 42 to the holding part 54. In a corresponding manner, the format part 42 can be detached in a user-friendly manner by lifting the holding part 54 by overcoming the magnetic force. With regard to the rest, reference is made to the above statements.

The plunger 44 is used to transfer closing elements 208, in the present case in the form of plunger stoppers 210, into a receiving part 212 for closing the vials 14. With the receiving part 212, the plunger stoppers 210 are placed above the filled vials 14 and are subsequently pressed on by means of plungers (not shown in the drawing).

The additional aforementioned format parts 42, for example the gripping elements 46, receiving elements 48 or the holding element 50, can also be detachably attached to the holding parts 54 assigned thereto by means of securing devices in accordance with the present disclosure, wherein magnetic elements for providing a magnetic holding force are used.

The invention claimed is:

1. A securing device for detachably fastening a format part of an apparatus for processing pharmaceutical containers or components of pharmaceutical containers on a holding part of the apparatus, wherein the format part has at least one container-specific, container-component-specific or process-specific quality, wherein the securing device comprises a first securing element and a second securing element, wherein the first securing element is arranged on or comprised by the format part, and the second securing element is arranged on or comprised by the holding part, wherein the securing elements comprise a receptacle and a projection which is arranged in the receptacle when the securing elements are in a securing position, the securing elements being positively engaged with one another in the securing position, and wherein the securing elements comprise magnetic elements which interact when the interconnected securing elements are in the securing position, wherein the respective the magnetic element is encapsulated in the respective securing element and free of contact with the atmosphere, the magnetic elements being arranged at a distance from one another and free of contact with one another when the securing elements are in the securing position, wherein one of the magnetic elements is arranged on a base of the receptacle, the receptacle having or forming a receiving body with a receiving space, the magnetic element being arranged in the receiving space behind a base wall on a side which faces away from the projection, and wherein the other magnetic element is arranged on an end face of the projection, the projection having or forming a receiving body with a receiving space, the magnetic element being arranged in the receiving space behind an end wall on a side which faces away from the base.

2. The securing device in accordance with claim 1, wherein at least one of the magnetic elements is a magnet.

3. The securing device in accordance with claim 2, wherein the magnet is a permanent magnet.

4. The securing device in accordance with claim 1, wherein each magnetic element is fixed to the respective securing element in at least one of the following ways:
by a force-locking and/or positive connection;
by an integral bond;
by a screw connection;
by pressing;
by gluing;
the magnetic element is injected, cast or rolled into the securing element.

5. The securing device in accordance with claim 1, wherein
the securing elements are interconnected with one another without gaps in the securing position.

6. The securing device in accordance with claim 1, wherein the receptacle and the projection are each rotationally symmetrical or substantially rotationally symmetrical with respect to a common axis of the securing elements when they assume the securing position.

7. The securing device in accordance with claim 1, wherein the projection is configured to taper in an insertion direction into the receptacle, and wherein the receptacle is configured to taper in the insertion direction starting from an insertion opening for the projection.

8. The securing device in accordance with claim 1, wherein the projection and the receptacle comprise at least one corresponding fit interconnected in the securing position.

9. The securing device in accordance with claim 8, wherein the at least one fit is a cylinder fit formed by respective lateral surfaces of the projection and of the receptacle.

10. The securing device in accordance with claim 8, wherein, relative to the insertion direction, two fits are arranged at a distance from one another on the projection and on the receptacle.

11. The securing device in accordance with claim 1, wherein each magnetic element is positively engaged in the respective receiving space.

12. The securing device in accordance with claim 1, wherein at least one of the magnetic elements is acted upon by a pressing element with a force in the direction of the additional securing element.

13. The securing device in accordance with claim 1, wherein a sealing element is arranged on each magnetic element on the side facing away from the respectively other securing element.

14. The securing device in accordance with claim 1, wherein the securing element comprises a receiving member forming the receiving space and a base member connected to the receiving member.

15. The securing device in accordance with claim 1, wherein the securing device comprises a plurality of first securing elements and second securing elements, and wherein the first securing elements are configured identically, and the second securing elements are configured identically.

16. An apparatus for processing pharmaceutical containers or components of pharmaceutical containers, comprising at least one format part and at least one holding part assigned thereto, wherein the at least one format part has at least one container-specific, container-component-specific or process-specific quality, and wherein the at least one format part is detachably connectable to the at least one holding part by means of a securing device, wherein the securing device comprises a first securing element and a second securing element, wherein the first securing element is arranged on or comprised by the format part, and the second securing element is arranged on or comprised by the holding part, wherein the securing elements comprise a receptacle and a projection which is arranged in the receptacle when the securing elements are in a securing position, the securing elements being positively engaged with one another in the securing position, and wherein the securing elements comprise magnetic elements which interact when the interconnected securing elements are in the securing position, wherein the respective the magnetic element is encapsulated in the respective securing element and free of contact with the atmosphere, the magnetic elements being arranged at a distance from one another and free of contact with one another when the securing elements are in the securing position, wherein one of the magnetic elements is arranged on a base of the receptacle, the receptacle having or forming a receiving body with a receiving space, the magnetic element being arranged in the receiving space behind a base wall on a side which faces away from the projection, and wherein the other magnetic element is arranged on an end face of the projection, the projection having or forming a receiving body with a receiving space, the magnetic element being arranged in the receiving space behind an end wall on a side which faces away from the base.

17. The apparatus in accordance with claim 16, wherein two or more format parts of the at least one format part, which differ from one another with regard to their qualities, are assigned to a respective holding part, and wherein the two or more format parts are selectively connectable to the holding part.

18. The apparatus in accordance with claim 16, wherein the at least one format part is assigned a plurality of holding parts and is connected to the holding parts via a respective securing device.

19. The apparatus in accordance with claim 16, wherein the at least one format part is a carrier part for the containers, a transport wheel or a gripping element for the containers.

20. The apparatus in accordance with claim 16, wherein the at least one format part is a plunger for a closing element of the container.

\*   \*   \*   \*   \*